US009532381B2

(12) United States Patent
Yoo et al.

(10) Patent No.: US 9,532,381 B2
(45) Date of Patent: Dec. 27, 2016

(54) HIDDEN NODE DETECTION METHOD AND APPARATUS IN WIRELESS COMMUNICATION SYSTEM

(71) Applicant: Electronics and Telecommunications Research Institute, Daejeon (KR)

(72) Inventors: Sung Jin Yoo, Daejeon (KR); Jin Suk Pak, Daejeon (KR); Byung Jang Jeong, Daejeon (KR); Sung Hyun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 160 days.

(21) Appl. No.: 14/461,124

(22) Filed: Aug. 15, 2014

(65) Prior Publication Data

US 2015/0208441 A1    Jul. 23, 2015

(30) Foreign Application Priority Data

Jan. 21, 2014 (KR) .................. 10-2014-0007044

(51) Int. Cl.
*H04W 4/00* (2009.01)
*H04W 74/08* (2009.01)

(52) U.S. Cl.
CPC ............... *H04W 74/0816* (2013.01)

(58) Field of Classification Search
CPC .................................................. H04W 84/12
USPC ......................................................... 370/338
See application file for complete search history.

(56) References Cited

U.S. PATENT DOCUMENTS

| 2010/0232324 A1* | 9/2010 | Radunovic | H04L 12/413 370/277 |
| 2011/0201283 A1* | 8/2011 | Lorenz | H04B 7/0617 455/78 |
| 2012/0230317 A1* | 9/2012 | Kim | H04L 1/1854 370/338 |
| 2016/0081010 A1* | 3/2016 | Seok | H04W 48/16 370/329 |

FOREIGN PATENT DOCUMENTS

KR    1020050002849 A    1/2005

* cited by examiner

*Primary Examiner* — Christopher R Crompton
(74) *Attorney, Agent, or Firm* — William Park & Associates Ltd.

(57) ABSTRACT

Provided is a hidden node detection method and apparatus in a wireless communication system, the apparatus including a sensing unit to sense a first communication device transmitting a data signal from among a plurality of communication devices sharing a wireless channel, a transmitter to generate a reception notification signal in response to the sensing, and transmit the reception notification signal to the a plurality of communication devices through a band identical to a transmission band of the data signal, and a controller to prevent a collision with the data signal transmitted from the first communication device through the wireless channel by delaying processing of a data transmission request when the data transmission request is input from a second communication device among the plurality of communication devices while maintaining the transmitting of the reception notification signal.

20 Claims, 24 Drawing Sheets

HIDDEN NODE DETECTION METHOD AND APPARATUS IN WIRELESS COMMUNICATION SYSTEM

CROSS-REFERENCE TO RELATED APPLICATION

This application claims the priority benefit of Korean Patent Application No. 10-2014-0007044, filed on Jan. 21, 2014, in the Korean Intellectual Property Office, the disclosure of which is incorporated herein by reference.

BACKGROUND

1. Field of the Invention

The present invention relates to technology for generating a reception notification signal in response to sensing of a first communication device transmitting a data signal, transmitting the generated reception notification signal to a plurality of communication devices sharing a wireless channel with the first communication device, providing notification on an occupation of the wireless channel by the first communication device to each of the communication devices, and delaying processing of a data transmission request input from a second communication device while maintaining the transmitting of the reception notification signal, thereby effectively preventing a collision between data signals transmitted through the wireless channel.

2. Description of the Related Art

In general, a method of managing wireless resources in a wireless communication system may be classified into a centralized scheme and a distributed scheme.

In the centralized scheme, the wireless communication system may use a licensed band for allocating wireless resources to a single communication device disposed in a predetermined area. A mobile communication network led by a third generation partnership project (3GPP) may be an example of the wireless communication system employing the centralized scheme. The mobile communication network may include a plurality of cell areas, and all wireless resources may be managed by a single node in each of the cell areas. Thus, a node may allocate available wireless resources to each communication device to prevent an occurrence of a collision.

However, in a wireless communication system employing a distributed wireless resources management scheme using an unlicensed band such as an industrial, scientific, and medical (ISM) band, since wireless resources are shared among communication devices, a single node may experience a difficulty in controlling allocation of wireless resources to all communication devices, which may be possible in a centralized wireless resources management scheme. Thus, in the unlicensed band, each of the communication devices may individually determine a time for using wireless resources.

In the distributed wireless resources management scheme, a probability of a wireless resources collision occurring between communication devices may be relatively high when compared to the centralized wireless resources management scheme. A wireless local area network (WLAN), for example the Institute of Electrical and Electronics Engineers (IEEE) 802.11 may be an example of a wireless communication system using the distributed wireless resources management scheme. In the WLAN, a carrier sense multiple access with commission avoidance (CSMA/CA) method may be used to reduce occurrences of wireless resources collisions between communication devices.

In the WLAN employing the CSMA/CA method, an occurrence of a collision between the communication devices may be avoided by verifying whether wireless resources are being used by another communication device before transmitting the data signal using the wireless resources, and initiating transmission of a data signal. However, in the CSMA/CA method, a hidden node issue may arise when a signal of another communication device is not verified based on a position of each communication device.

FIG. 1 illustrates a transmission and reception range of a communication device in a case of an occurrence of a hidden node issue according to a related art. FIG. 2 illustrates an example in which a hidden node issue occurs according to a related art.

Referring to FIG. 1, when a communication device A transmits a data signal to a communication device B, the data signal transmitted from the communication device A may not reach a communication device C disposed outside a transmission and reception range of the communication device A.

In this example, the communication device C may determine that a communication device transmitting a data signal is absent and thus, transmit a data signal.

Referring to FIG. 2, a hidden node issue which causes a collision due to data signals being simultaneously transmitted from a communication device A and a communication device B may occur in a communication device B. Thus, the communication device B may experience difficulty in demodulating the data signals transmitted from the communication device A and the communication device C.

To solve the hidden node issue, a scheme of using a request-to-send (RTS) signal and a clear-to-send (CTS) signal may be suggested in a related art.

FIG. 3 illustrates an example of preventing a hidden node issue using an RTS signal and a CTS signal according to a related art.

Referring to FIG. 3, in a related art, when a communication device A is to transmit a data signal to a communication device B, the aforementioned hidden node issue may be prevented by sequentially transmitting the RTS signal and the CTS signal in advance, provide notification that the communication device A is transmitting the data signal using a wireless channel to a communication device C and then, transmitting the data signal.

However, in this case, since a separate control signal such as the RTS signal and the CTS signal is transmitted along with the data signal, protocol overhead may increase.

Accordingly, there is a desire for technology to minimize protocol overhead and prevent a hidden node issue.

SUMMARY

An aspect of the present invention provides a method and apparatus for generating a reception notification signal in response to sensing a first communication device transmitting a data signal, transmitting the reception notification signal to a plurality of communication devices through a band identical to a transmission band of the data signal, and providing notification on an occupation of a wireless channel by the first communication device to each of the communication devices without using a separate control channel for the reception notification signal, thereby solving a hidden node issue in a wireless communication system and reducing protocol overhead.

Another aspect of the present invention also provides a method and apparatus for delaying processing of a data transmission request input from a second communication device while maintaining transmission of a reception notification signal, thereby effectively preventing a collision between data signals transmitted through a wireless channel.

Still another aspect of the present invention also provides a method and apparatus for minimizing overhead due to transmission of a reception notification signal by generating the reception notification signal using a tone signal.

Yet another aspect of the present invention also provides a method and apparatus for minimizing an effect of self-interference caused by a reception notification signal in a communication device demodulating a transmitted data signal by transmitting at least one narrowband signal to each communication device as the reception notification signal.

Further another aspect of the present invention also provides a method and apparatus for minimizing an effect of self-interference caused by a reception notification signal by transmitting the reception notification signal to each communication device through a frequency interval, aside from a band through which a data signal is transmitted.

Still another aspect of the present invention also provides a method and apparatus for detecting a reception notification signal generated using at least one narrowband signal with additional ease by detecting whether the reception notification signal is transmitted to each communication device by applying a weight to a narrowband signal position based on a carrier sensing scheme.

Yet another aspect of the present invention also provides a method and apparatus for detecting a reception notification signal with additional ease by detecting whether the reception notification signal is transmitted to each communication device based on a difference in an average power density between a band through which the reception notification signal is transmitted and a band through which the reception notification signal is not transmitted.

Further another aspect of the present invention also provides a method and apparatus for transmitting and receiving, before transmission of a data signal, a request-to-send tone (RTST) signal and a clear-to-send tone (CTST) signal provided in a tone structure to have a shorter length when compared to an request-to-send/clear-to-send RTS/CTS control packet, and providing notification on an occupation of a wireless channel by a first communication device, to a plurality of communication devices, thereby reducing protocol overhead.

According to an aspect of the present invention, there is provided a hidden node detection apparatus in a wireless communication system, the apparatus including a sensing unit to sense a first communication device transmitting a data signal from among a plurality of communication devices sharing a wireless channel, a transmitter to generate a reception notification signal in response to the sensing, and transmit the reception notification signal to the a plurality of communication devices through a band identical to a transmission band of the data signal, and a controller to prevent a collision with the data signal transmitted from the first communication device through the wireless channel by delaying processing of a data transmission request when the data transmission request is input from a second communication device among the plurality of communication devices while maintaining the transmitting of the reception notification signal.

According to another aspect of the present invention, there is also provided a hidden node detection method in a wireless communication system, the method including sensing a first communication device transmitting a data signal, from among a plurality of communication devices sharing a wireless channel, generating a reception notification signal in response to the sensing, and transmitting the generated reception notification signal to the plurality of communication devices through a band identical to a transmission band of the data signal, and preventing a collision with the data signal transmitted from the first communication device through the wireless channel, by delaying processing of a data transmission request when the data transmission request is input from a second communication device among the plurality of communication devices while maintaining transmission of the reception notification signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
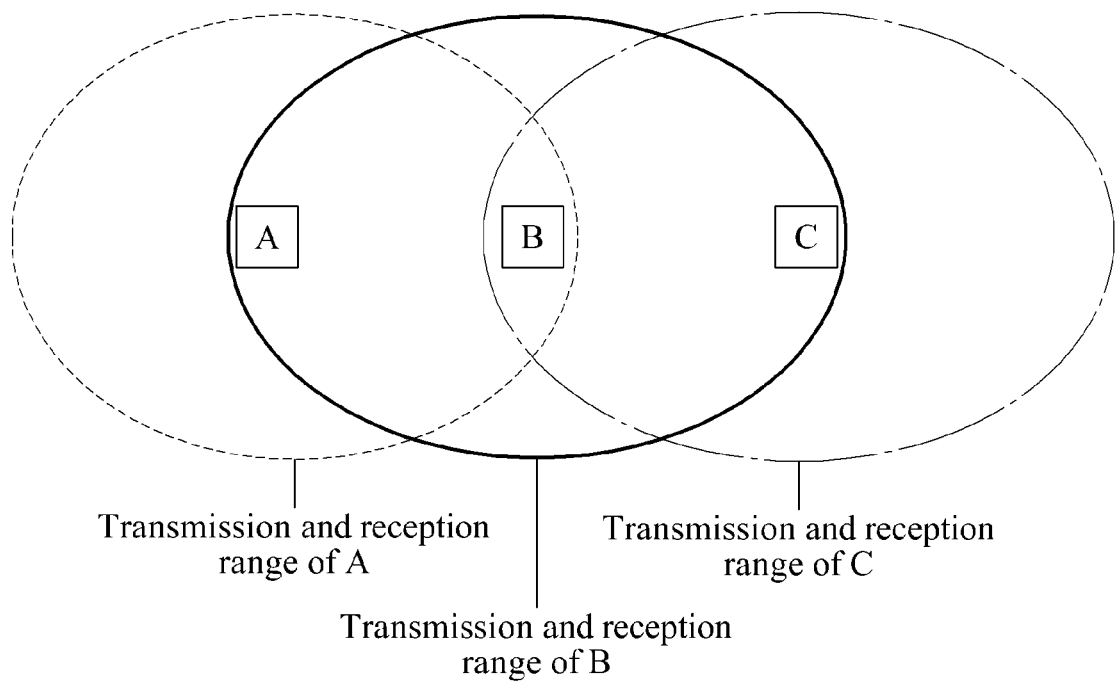
FIG. 1 illustrates a transmission and reception range of a communication device in a case of an occurrence of a hidden node issue according to a related art.
Figure 2:
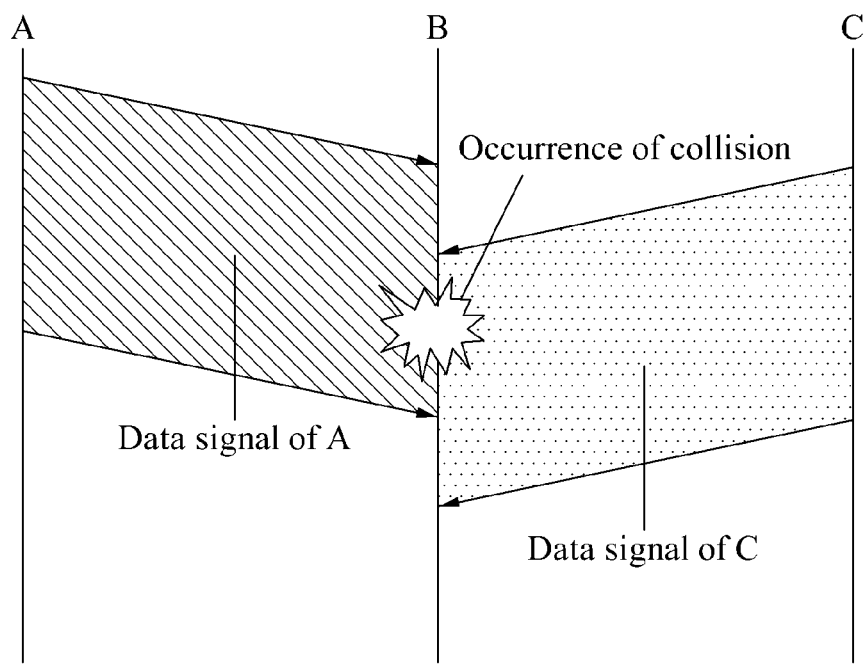
FIG. 2 illustrates an example in which a hidden node issue occurs according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A hidden node detection apparatus in a wireless communication system according to an embodiment of the present invention may be disposed inside or outside each communication device sharing a wireless channel. In an embodiment of the present invention, descriptions of the hidden node detection apparatus included in each communication device will be provided for increased clarity and conciseness.

As an example, the hidden node detection apparatus may be implemented inside a communication device receiving a data signal transmitted from a first communication device transmit a reception notification signal by generating the reception notification signal in response to sensing of the first communication device, and delay processing of a data transmission request when the data transmission request is input from a second communication device among a plurality of communication devices while maintaining the transmitting of the reception notification signal, thereby preventing a collision with the data signal transmitted from the first communication device through the wireless channel.

As another example, the hidden node detection apparatus may be implemented inside the second communication device different from the first communication device, and detect whether the reception notification signal is received by the second communication device based on a difference in an average power density between a band through which the reception notification signal is transmitted and a band through which the reception notification signal is not transmitted. When the reception notification signal is detected, the second communication signal may readily ascertain the data signal being transmitted through the wireless channel from one of the plurality of communication device sharing the wireless channel. Also, the second communication device may not transmit the data signal while the reception notification signal is being detected, thereby preventing a collision between data signals in the wireless channel.

Figure 4:
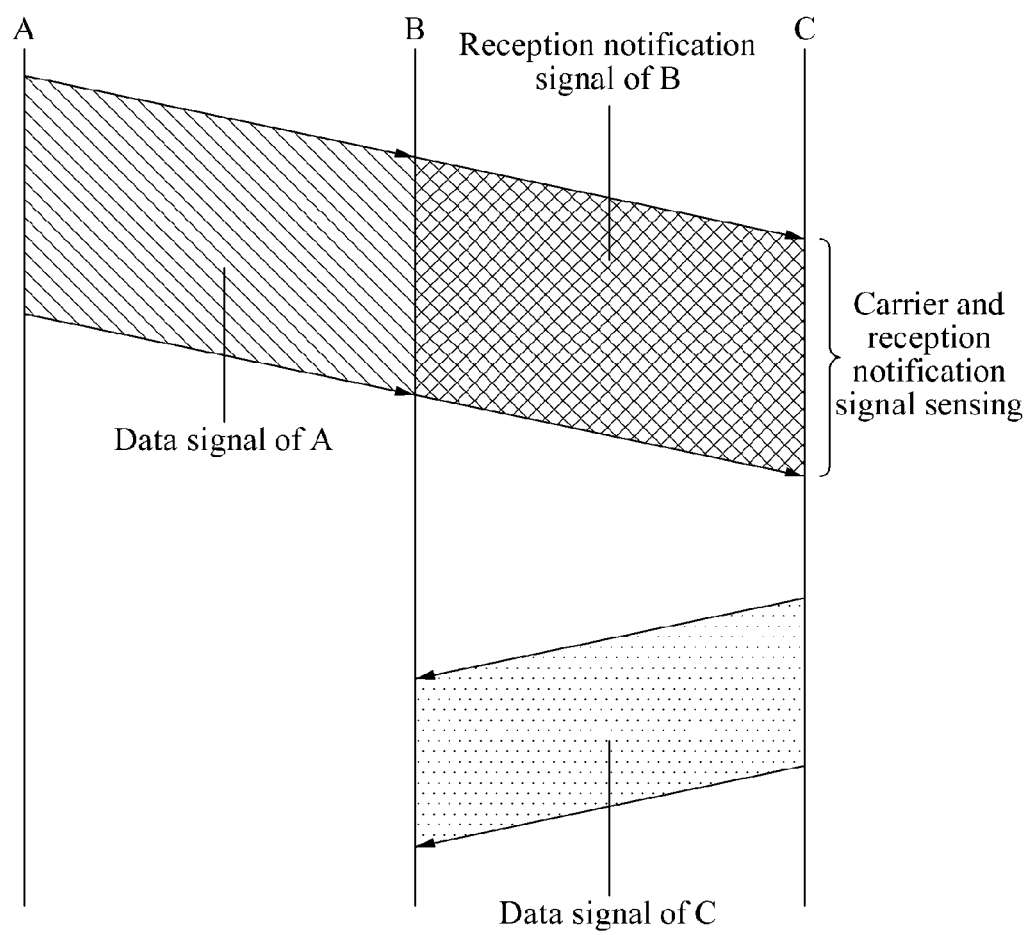
FIG. 4 illustrates an overall operation process of a hidden node detection apparatus in a wireless communication system according to an embodiment of the present invention.

FIG. 4 illustrates an overall operation process of a hidden node detection apparatus in a wireless communication system according to an embodiment of the present invention, Referring to FIG. 4, the hidden node detection apparatus may be implemented in a communication device B among a plurality of communication devices sharing a wireless channel.

For example, the communication device B may sense a data signal transmitted from a communication device A, and simultaneously transmit a reception notification signal indicating the data signal is being received, to a communication apparatus C sharing the wireless channel.

By detecting the reception notification signal, the communication device C may recognize that the communication device is receiving the data signal. During the detecting of the reception notification signal, the communication device C may not transmit the data signal to the communication device B.

When the communication device A terminates transmission of the data signal, the communication device B may suspend transmission of the reception notification signal.

The hidden node detection apparatus may be implemented in the communication device C.

For example, the communication device C may sense a carrier and a reception notification signal and transmit a data signal to the communication device B when the reception notification signal is verified to be undetected, thereby preventing a collision between data signals in the wireless channel.

In this example, the reception notification signal may exist in a band of a channel through which the data signal is transmitted from the communication device A and thus, a change in an existing carrier sensing scheme may be minimized.

Although the reception notification signal may reach the communication device A, the reception notification signal may not significantly affect an operation of the communication device A transmitting the data signal.

Figure 5:
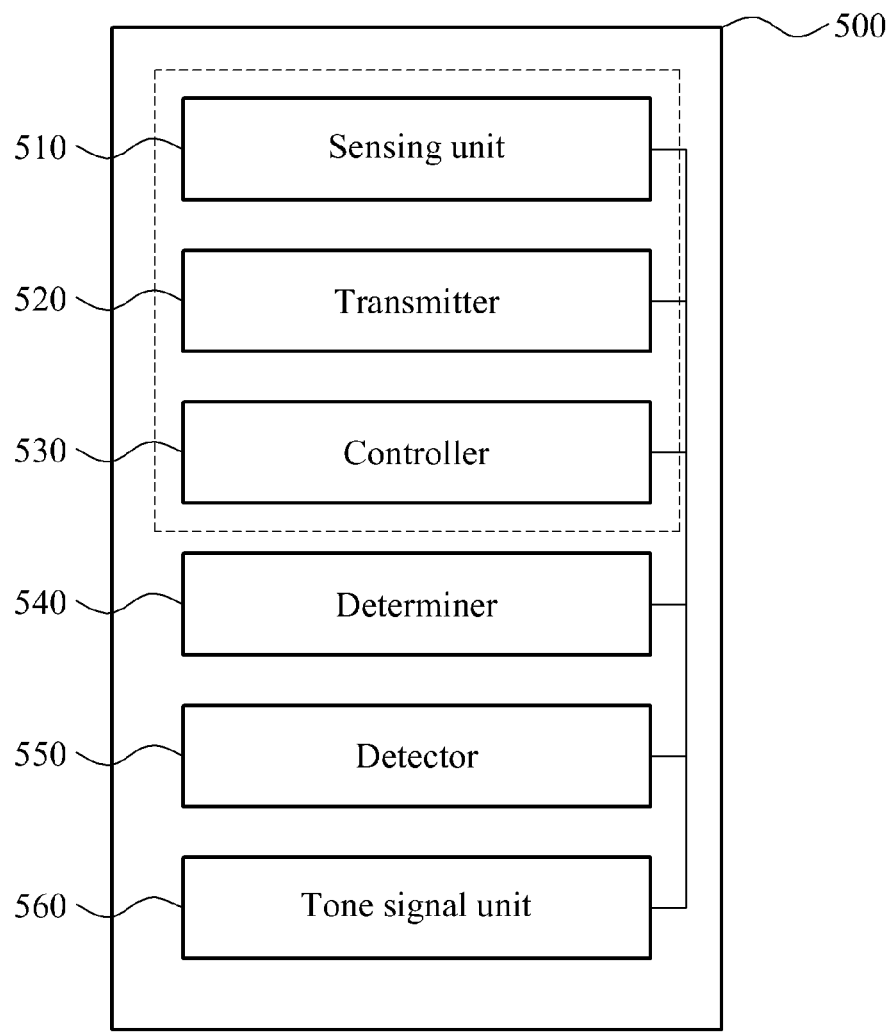
FIG. 5 illustrates an internal configuration of a hidden node detection apparatus in a wireless communication system according to an embodiment of the present invention.

FIG. 5 illustrates an internal configuration of a hidden node detection apparatus 500 in a wireless communication system according to an embodiment of the present invention.

Referring to FIG. 5, the hidden node detection apparatus 500 may include a sensing unit 510, a transmitter 520, and a controller 530. In an embodiment, the hidden node detection apparatus 500 may also include a determiner 540, a detector 550, and a tone signal unit 560.

The sensing unit 510 may sense a first communication device transmitting a data signal, from among a plurality of communication devices sharing a wireless channel.

For example, the sensing unit 510 may sense the first communication device transmitting the data signal based on a carrier sensing scheme.

For example, the sensing unit 510 may sense a communication device transmitting a data signal of an intensity greater than a set threshold, to be the first communication device.

The sensing unit 510 may sense a communication device transmitting a data signal from which a destination address identical to a set device address is acquired, to be the first communication device.

The sensing unit 510 may sense a channel state in a physical state based on whether a detected radio frequency (RF) energy is greater than a threshold, or sense whether the wireless channel is being used by the first communication device, based on a channel occupation time in a frame transmitted from a node obtaining a wireless channel, for example, the first communication device.

In response to the sensing of the first communication device, the transmitter 520 may generate a reception notification signal, and transmit the reception notification signal through a band identical to a transmission band of the data signal.

For example, the transmitter 520 may achieve an effect of reducing protocol overhead by transmitting the reception notification signal using a band identical to a band through which the data signal is transmitted, in lieu of a separate control channel for the reception notification signal.

Also, the transmitter 520 may generate the reception notification signal based on a tone signal of at least one narrowband.

According to an embodiment of the present invention, overhead caused during transmission of a reception notification signal may be minimized by generating the reception notification signal based on a tone signal.

In addition, according to an embodiment of the present invention at least one narrowband signal may be transmitted to each communication device as a reception notification signal, thereby minimizing an effect of self-interference due to the reception notification signal in a communication device demodulating a transmitted data signal.

Hereinafter, descriptions about the transmitter 520 will be provided with reference to FIGS. 6A and 6B.

Figure 6A:
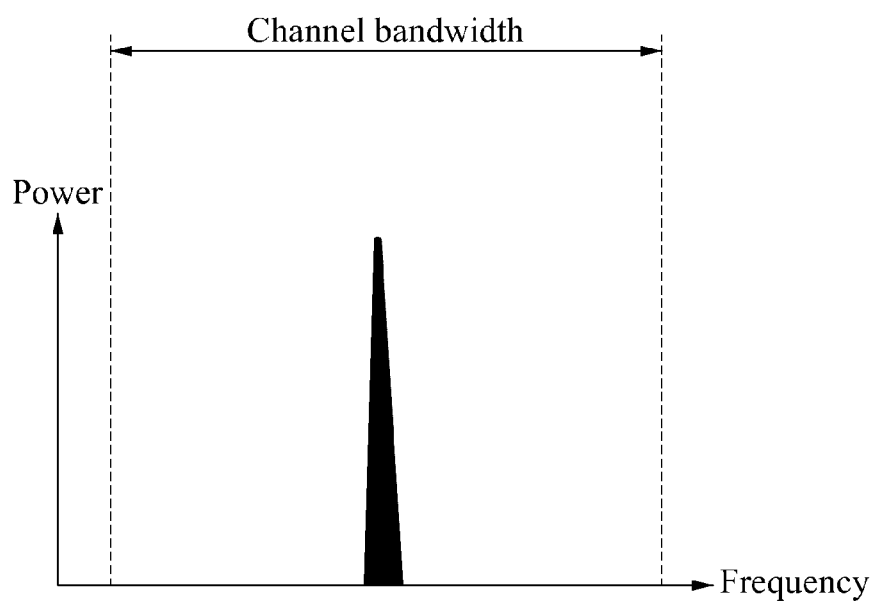
FIGS. 6A and 6B illustrate examples of a reception notification signal according to an embodiment of the present invention.
Figure 6B:
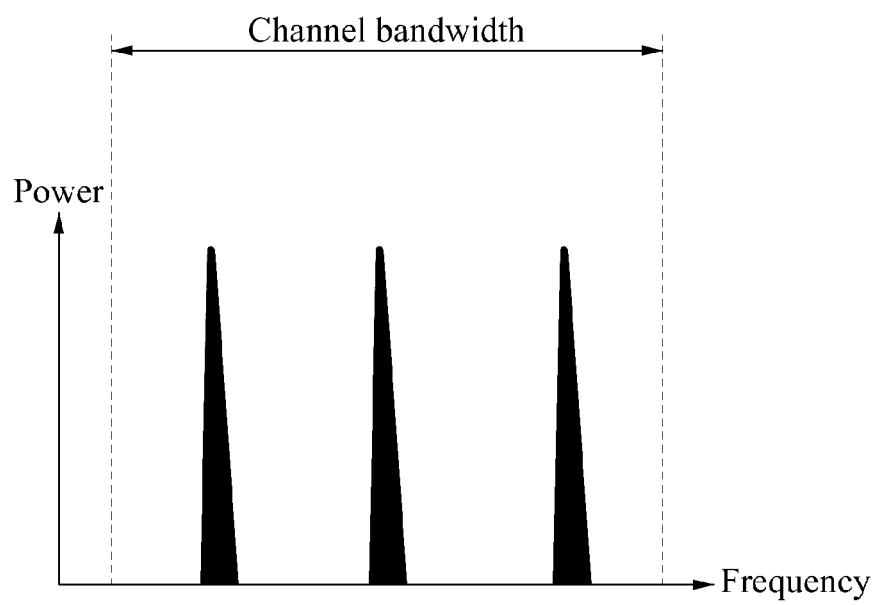

FIGS. 6A and 6B illustrate examples of a reception notification signal according to an embodiment of the present invention.

Referring to FIGS. 6A and 6B, the transmitter 520 may use at least one narrowband signal as the reception notification signal.

Figure 3:
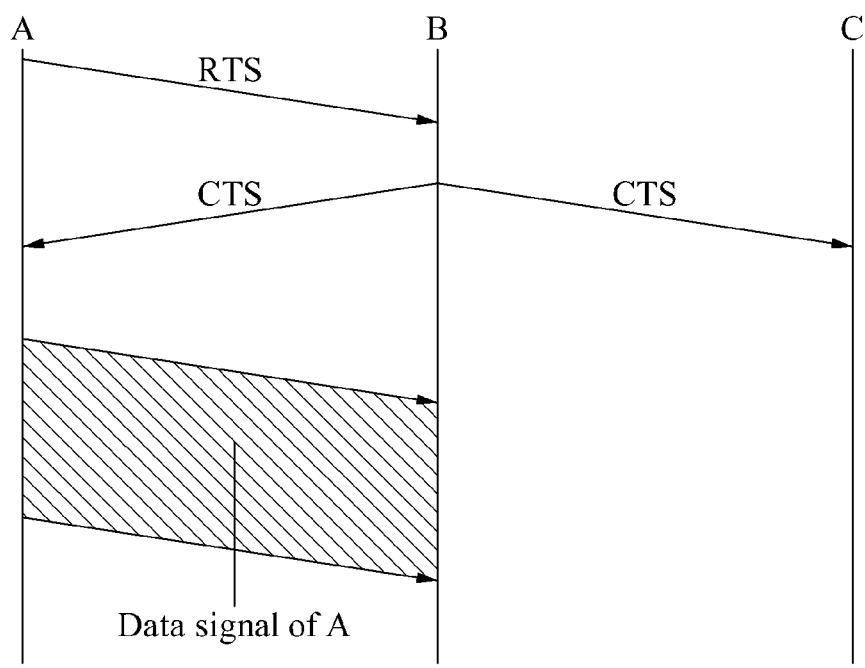
FIG. 3 illustrates an example of preventing a hidden node issue using a request-to-send (RTS) signal and a clear-to-send (CTS) signal according to a related art.

In FIG. 3, when the communication device B receives a data signal from the communication device A and simultaneously transmits a reception notification signal to the communication device C, the reception notification signal may cause an interference effect in a process of demodulating the data signal in the communication device B.

The transmitter 520 may generate a reception notification signal based on at least one narrowband signal of FIGS. 6A and 6B and thus, minimize an effect of interference caused by the reception notification signal in the communication device B receiving the data signal.

The transmitter 520 may effectively reduce the effect of interference by generating the reception notification signal based on a narrowband signal close to a tone signal due to a narrow band.

The transmitter 520 may transmit the reception notification signal of the narrowband to have a higher power density per frequency than that of the data signal.

The detector 550 may detect whether the reception notification signal is received by the plurality of communication devices based on a difference in an average power density between a band through which the reception notification signal is transmitted and a band through which the reception notification signal is not transmitted.

In each of the communication devices, a sensing threshold may be set based on a data signal corresponding to a relatively wide band. Thus, the transmitter 520 may transmit the reception notification signal to have a higher power density than that of the data signal such that the reception notification signal of the narrowband is easily detected from a communication device receiving the reception notification signal. In this example, an effect of self-interference may increase in the communication device B due to the reception notification signal having the higher density.

Hereinafter, descriptions about the detector 550 will be provided with reference to FIGS. 7 and 8.

Figure 7:
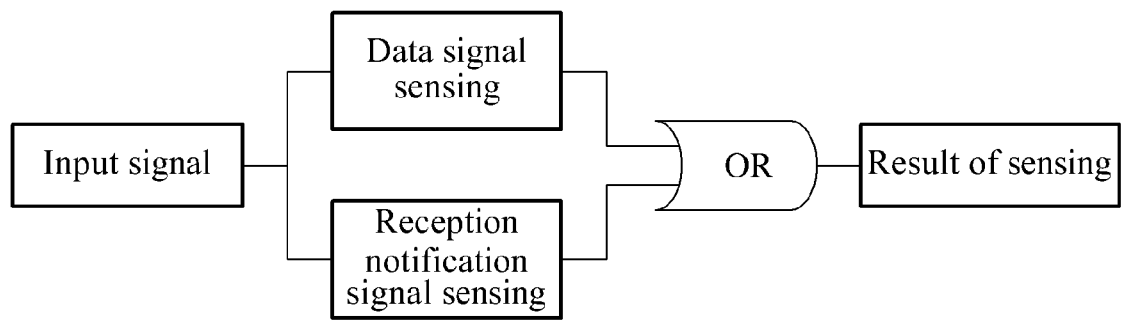
FIG. 7 illustrates a carrier sensing configuration according to an embodiment of the present invention.

FIG. 7 illustrates a carrier sensing configuration according to an embodiment of the present invention.

Referring to FIG. 7, the detector 550 may change the carrier sensing configuration such that the transmitter 520 does not significantly increase a power density of a reception notification signal.

In this example, the detector 550 may use a separate reception notification signal sensing device along with a carrier sensing device for sensing a data signal, and determine, when sensing is performed in one of the carrier sensing device and the reception notification signal sensing device, that a corresponding carrier is being used by a communication device sharing a wireless channel.

Figure 8:
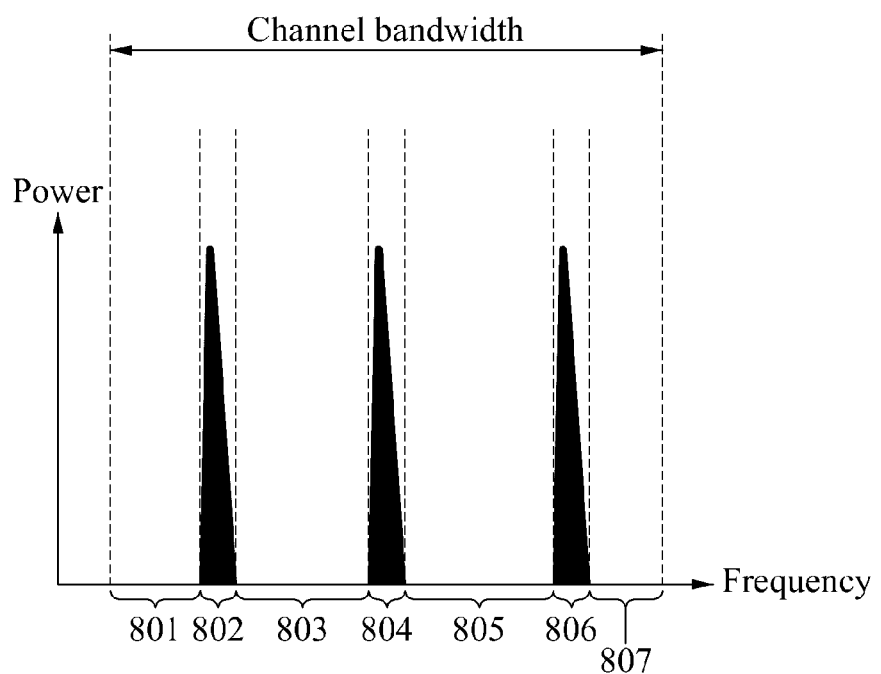
FIG. 8 illustrates an example of a reception notification signal according to an embodiment of the present invention.

FIG. 8 illustrates an example of a reception notification signal according to an embodiment of the present invention.

Frequency bands 802, 804, and 806 through which a reception notification signal is transmitted and frequency bands 801, 803, 805, and 807 which are vacant and do not contain a signal may be shown with reference to FIG. 8.

Referring to FIG. 8, since the frequency bands 802, 804, and 806 through which the reception notification signal is transmitted are relatively small when compared to a channel bandwidth, the reception notification signal may not be detected based on an existing carrier sensing scheme.

In this example, the detector 550 may detect the reception notification signal by comparing absolute signal intensities, or comparing relative signal intensities. Here, a threshold for detecting the reception notification signal may be set to be less than or equal to a threshold for detecting a data signal.

As an example, in a case of comparing the absolute signal intensities, since a threshold of an existing carrier sensing is determined based on a channel bandwidth, the detector 550 may decrease a threshold to detect a reception notification signal of a narrowband. Also, in a process of measuring an intensity of the reception notification signal, the detector 550 may eliminate an effect of the frequency bands 801, 803, 805, and 807 which are vacant and do not contain a signal, through filtering. For example, when a signal intensity is greater than the threshold for detecting the reception notification signal in the frequency bands 802, 804, and 806, the detector 550 may detect the reception notification signal.

As another example, in a case of comparing the relative signal intensities, when an average power density in the frequency bands 802, 804, and 806 is greater than a value obtained through an addition of a power density threshold and the average power density in the frequency bands 801, 803, 805, and 807, the detector 550 may detect the reception notification signal.

Referring back to FIG. 5, the transmitter 520 may transmit the reception notification signal to the plurality of communication devices using a frequency band, aside from a band through which the data signal is transmitted in the wireless channel.

Hereinafter, descriptions about the transmitter 520 will be provided with reference to FIG. 9.

Figure 9:
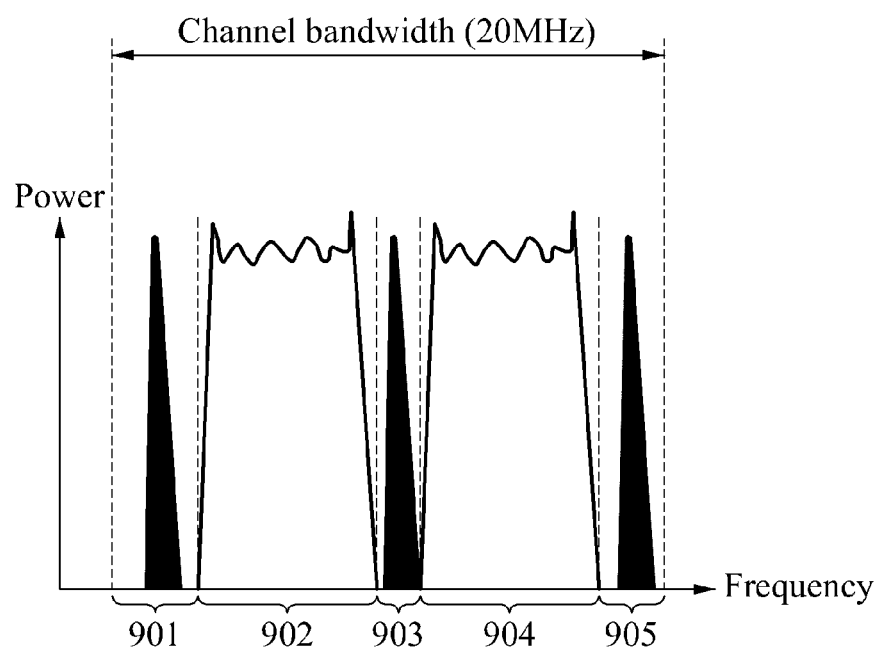
FIG. 9 illustrates an example of frequency bands of a data signal and a reception notification signal according to an embodiment of the present invention.

FIG. 9 illustrates an example of frequency bands of a data signal and a reception notification signal according to an embodiment of the present invention.

Referring to FIG. 9, a data signal may be transmitted based on an orthogonal frequency division multiplexing (OFDM) scheme in an Institute of Electrical and Electronics Engineers (IEEE) 802.11a wireless local area network (WLAN) system. In this example, the transmitter 520 may transmit a reception notification signal using a vacant subcarrier, in lieu of all subcarrier.

In FIG. 9, subcarriers 902 and 904 may be used to transmit a data signal, and subcarriers 901, 903, and 905 may be vacant.

In a process of transmitting the reception notification signal, the transmitter 520 may transmit the reception notification signal at a frequency of the subcarriers 901, 903, and 905, thereby reducing self-interference.

Referring back to FIG. 5, the transmitter 520 may generate the reception notification signal to include predetermined power information, and transmit the generated reception notification signal to the plurality of communication devices.

Through this, the transmitter 520 may prevent an occurrence of a hidden node issue, and control a transmission power of a second communication device receiving the reception notification signal based on the predetermined power information.

When the reception notification signal is transmitted to include the predetermined power information, the transmitter 520 may need to be aware of a transmission end time associated with a data signal of a first communication device in order to suspend transmission of the reception notification signal.

As an example, when an intensity of the data signal is less than or equal to a set threshold, the transmitter 520 may suspend the transmission of the reception notification signal. When a frame length calculated with respect to the data signal satisfies a determined overall frame length value, the transmitter 520 may suspend the transmission of the reception notification signal.

The transmitter 520 may encode information on a transmission time to the reception notification signal, and transmit the encoded reception notification signal.

The determiner 540 may determine a transmission time during which transmission of the reception notification signal is maintained, based on length field information in a physical layer convergence procedure (PLCP) header included in the data signal, or duration information in a media access control (MAC) address header included in the data signal.

The determiner 540 may determine, to be the transmission time, a value obtained by dividing a channel occupation time during which the first communication device occupies the wireless channel, by a compression ratio of the reception notification signal.

Hereinafter, descriptions about the determiner 540 will be provided with reference to FIG. 16.

Figure 16:
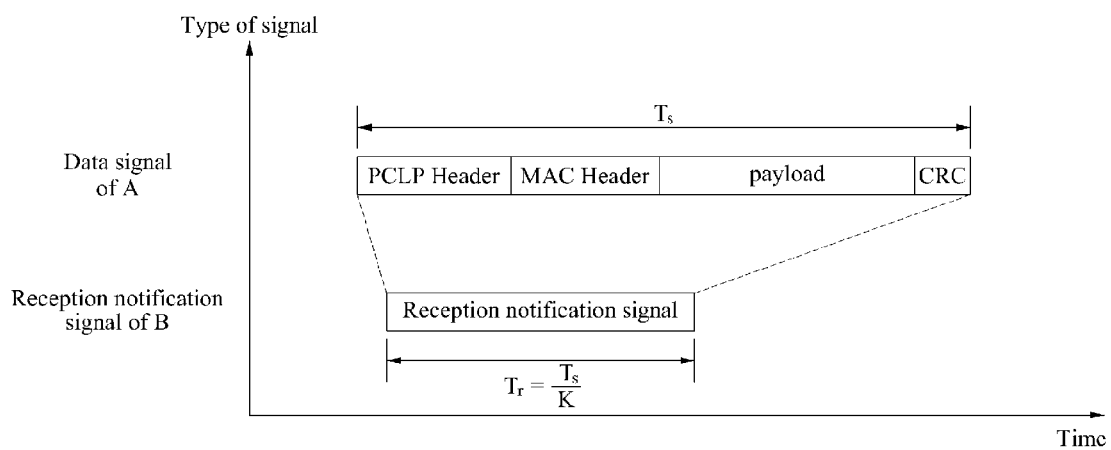
FIG. 16 illustrates an example of encoding using a length of a reception notification signal according to an embodiment of the present invention.

FIG. 16 illustrates an example of encoding using a length of a reception notification signal according to an embodiment of the present invention.

Referring to FIG. 16, the determiner 540 may indicate a transmission time of the reception notification time based on a length of the reception notification signal.

For example, the transmitter 520 may detect a preamble from a PLCP header included in a data signal transmitted from a first communication device, and transmit the reception notification signal. The determiner 540 may determine a transmission time for the reception notification signal based on length field information on the PLCP header or duration field information on a MAC header.

As an example, when a wireless channel occupation time of the first communication device is $T_s$, a transmission time for a reception notification signal is $T_r$, and a compression ratio of the reception notification signal is K, the determiner 540 may determine a transmission time $T_r$ of the reception notification signal based on Equation 1.

$$T_r = \frac{T_s}{K} \quad \text{[Equation 1]}$$

In Equation 1, the determiner 540 may reduce a transmission time of the reception notification signal, for example, an interval for transmitting the reception notification signal, according to an increase in a K value, and achieve an effect of reducing self-interference.

In a communication device receiving the reception notification signal, a wireless channel occupation time $T_s$ of the first communication device may be obtained by multiplying a transmission time $T_r$ of the reception notification signal and a compression ratio K of the reception notification signal. Thus, since the data signal may not be transmitted during the wireless channel occupation time $T_s$ of the first communication device, an occurrence of a collision may be prevented in the communication device receiving the reception notification signal.

Referring back to FIG. 5, when a data transmission request is input from the second communication device among the plurality of communication devices during transmission of the reception notification signal, the controller 530 may delay processing of the data transmission request to prevent a collision with the data signal transmitted from the first communication device through the wireless channel.

According to an embodiment of the present invention, in response to sensing of a first communication device transmitting a data signal, a reception notification signal may be generated, the generated reception notification signal may be transmitted to a plurality of communication devices sharing a wireless channel with the first communication device, and notification indicating that the first communication device occupies the wireless channel may be provided to each of the communication devices, thereby solving a hidden node issue in a wireless communication system and reducing protocol overhead.

According to an embodiment of the present invention, processing of a data transmission request input from a second communication device while transmission of the reception notification signal is maintained may be delayed to effectively prevent a collision between data signals transmitted through the wireless channel.

When the transmission of the reception notification signal is suspended, the controller 530 may control the data signal of the second communication device to be transmitted through the wireless channel in response to the data transmission request.

In an embodiment, the hidden node detection apparatus 500 may also include a tone signal unit 560.

The tone signal unit 560 may receive a request-to-send tone (RTST) signal of a tone structure from the first communication device before the data signal is transmitted from the first communication device, transmit a clear-to-send tone (CTST) signal of the tone structure to the second communication device in response to the receiving of the RTST signal, and provide, to the second communication device, notification on the transmitting of the data signal from the first communication device.

According to an embodiment of the present invention, before transmission of a data signal, a CTST signal, and an RTST signal, each provided in the tone structure to have a length shorter than that of an RTS/CTS control packet may be transmitted and received, and provide notification on occupation of a wireless channel by the first communication device, to a plurality of communication devices sharing the wireless channel, thereby reducing protocol overhead.

Hereinafter, descriptions about the tone signal unit 560 will be provided with reference to FIGS. 19A through 21.

Figure 19A:
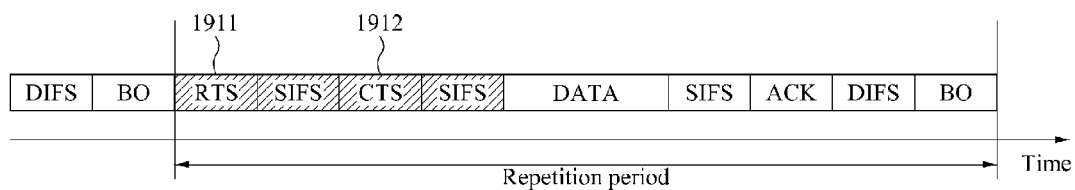
FIG. 19A illustrates a request-to-send tone (RTST) signal and a clear-to-send tone (CTST) signal according to a related art.
Figure 19B:
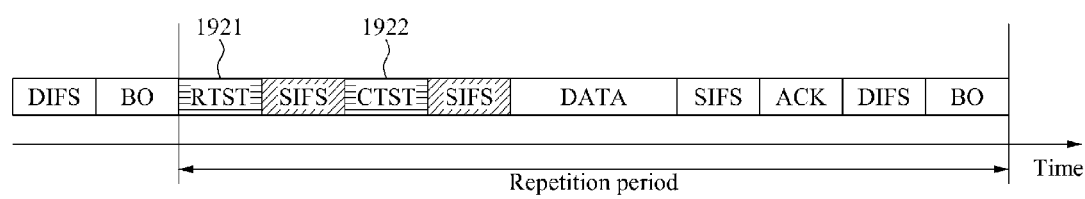
FIG. 19B illustrates an RTST signal and a CTST signal according to an embodiment of the present invention.

FIG. 19A illustrates an RTST signal and a CTST signal according to a related art, and FIG. 19B illustrates an RTST signal and a CTST signal according to an embodiment of the present invention.

An RTS/CTS method used in an existing WLAN may be indicated with reference to FIG. 19A. In an embodiment, an RTS signal 1911 and a CTS signal 1912 may be generated and transmitted to solve a hidden node issue. However, when a quantity of data to be transmitted is relatively small, overhead may increase in the RTS/CTS method.

An RTS/CTS messaging method according to an embodiment of the present invention may be indicated with reference to FIG. 19B.

The tone signal unit 560 may generate and transmit an RTST signal 1921 and a CTST signal 1922, in lieu of the RTS signal 1911 and the CTS signal 1912.

Here, the RTST signal 1921 and the CTST signal 1922 may be signals of tone structures in contrast to the RTS signal 1911 and the CTS signal 1912 which are control packets. For example, the tone signal unit 560 may reduce lengths of the RTS signal 1911 and the CTS signal 1912 and thus, reduce data transmission overhead.

Figure 20A:
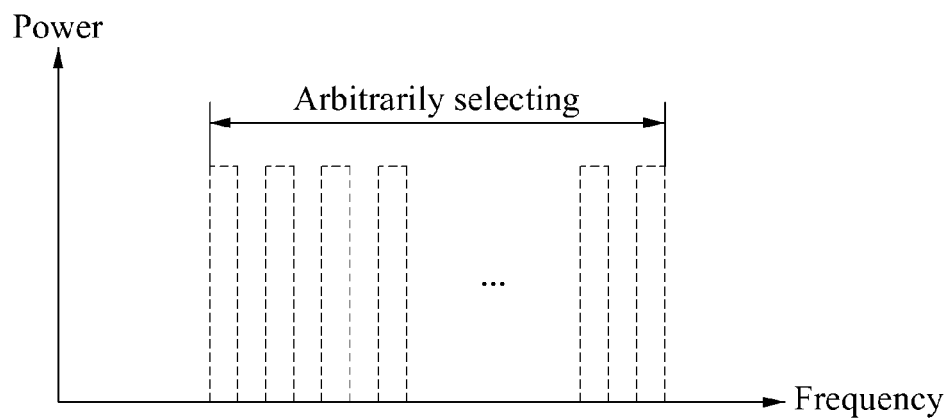
FIGS. 20A, through 20C illustrate a process of arbitrarily selecting a frequency for transmitting an RTST signal and a CTST signal according to an embodiment of the present invention.
Figure 20B:
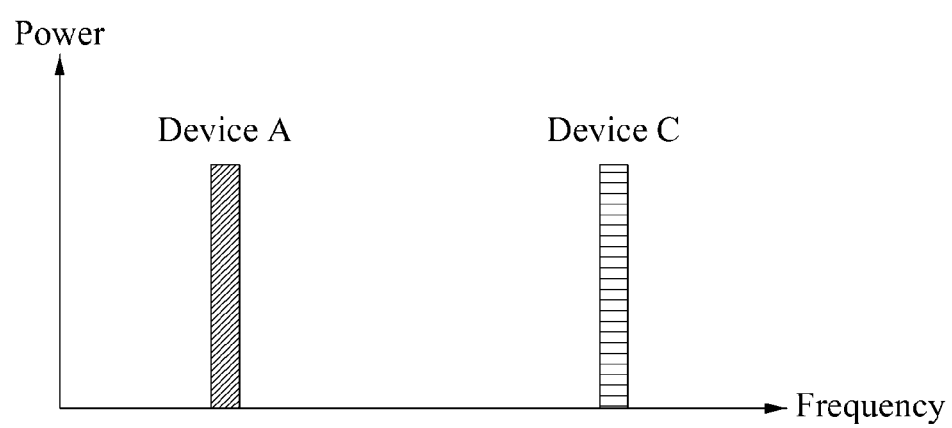
Figure 20C:
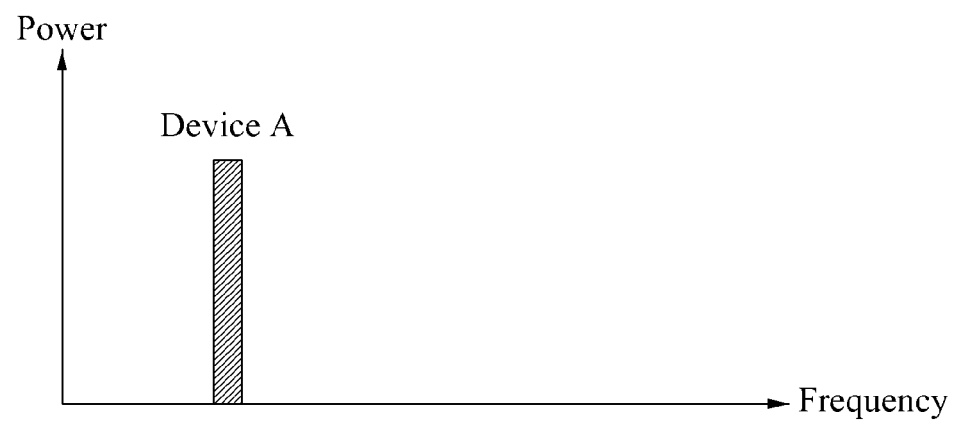

FIGS. 20A through 20C illustrate a process of arbitrarily selecting a frequency for transmitting an RTST signal and a CTST signal according to an embodiment of the present invention.

A predetermined frequency used for the RTST signal and the CTST signal may be indicated with reference to FIG. 20A.

An example of arbitrarily selecting a frequency used for the RTST signal may be indicated with reference to FIG. 20 B.

The tone signal unit 560 may select a frequency used for the RTST signal in a corresponding frequency domain from among predetermined frequencies of FIG. 20A. Alternatively, the frequency used for the RTST signal may be set when a communication device accesses an access point (AP).

An example of arbitrarily selecting a frequency used for the CTST signal may be indicated with reference to FIG. 20C.

When the RTST signal of FIG. 20B is received, the tone signal unit 560 may select a predetermined frequency from among frequencies of the received RTST signal, and transmit the CTST signal.

When the RTST signal is received based on a frequency allocated to a communication device in an initial access procedure, the tone signal unit 560 may select a communication device through scheduling, and transmit the CTST signal using a frequency of the selected communication device. A CTST signal of a case in which a communication device A is selected may be indicated with reference to FIG. 20C.

Figure 21:
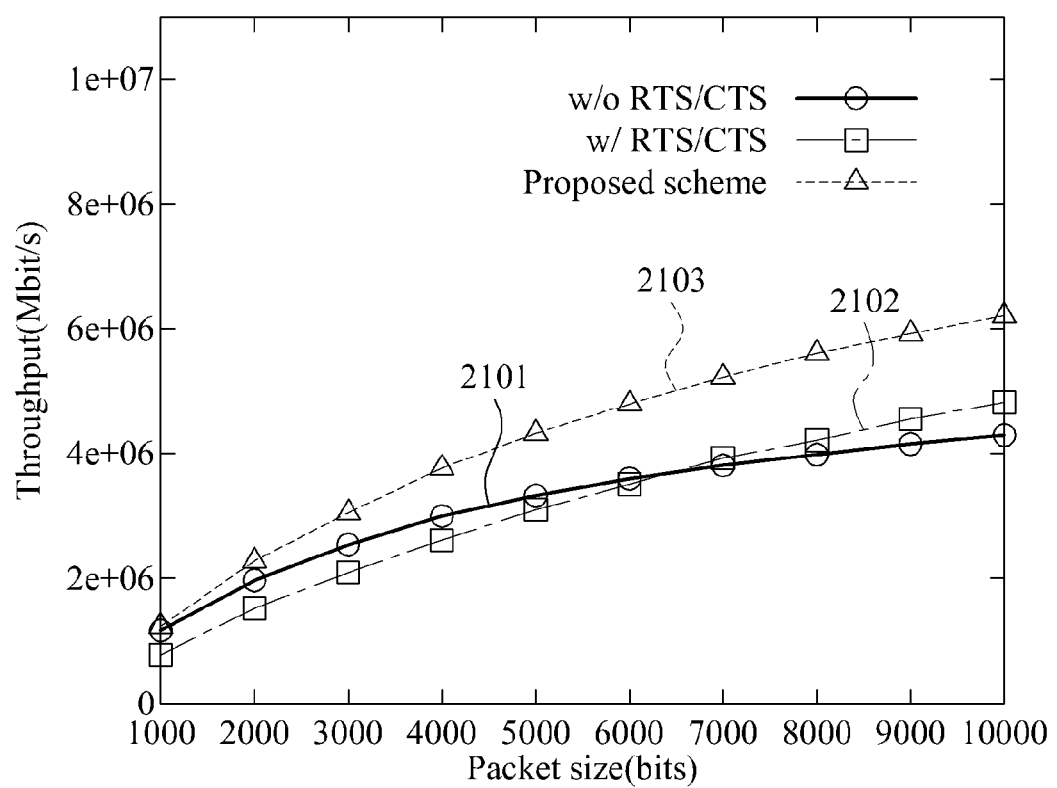
FIG. 21 illustrates a graph describing a performance improving effect in a case of using an RTST signal and a CTST signal according to an embodiment of the present invention.

FIG. 21 illustrates a graph describing a performance improving effect in a case of using an RTST signal and a CTST signal according to an embodiment of the present invention.

A performance graph of reducing overhead in a case in which a tone signal length of an RTST/CTST is set to be 100 microseconds (μs) may be indicated with reference to FIG. 21. In FIG. 21, "w/o RTS/CTS" may indicate a curve 2010 of a case in which an RTS/CTS is absent, and "w/ RTS/CTS" may indicate a curve 2102 of a case in which the RTS/CTS is present. "proposed scheme" may indicate a curve 2103 according to an embodiment of the present invention.

Hereinafter, descriptions about an operation in which the hidden node detection apparatus 500 according to an embodiment of the present invention transmits a reception notification signal will be provided with reference to FIGS. 10 through 15.

Figure 10:
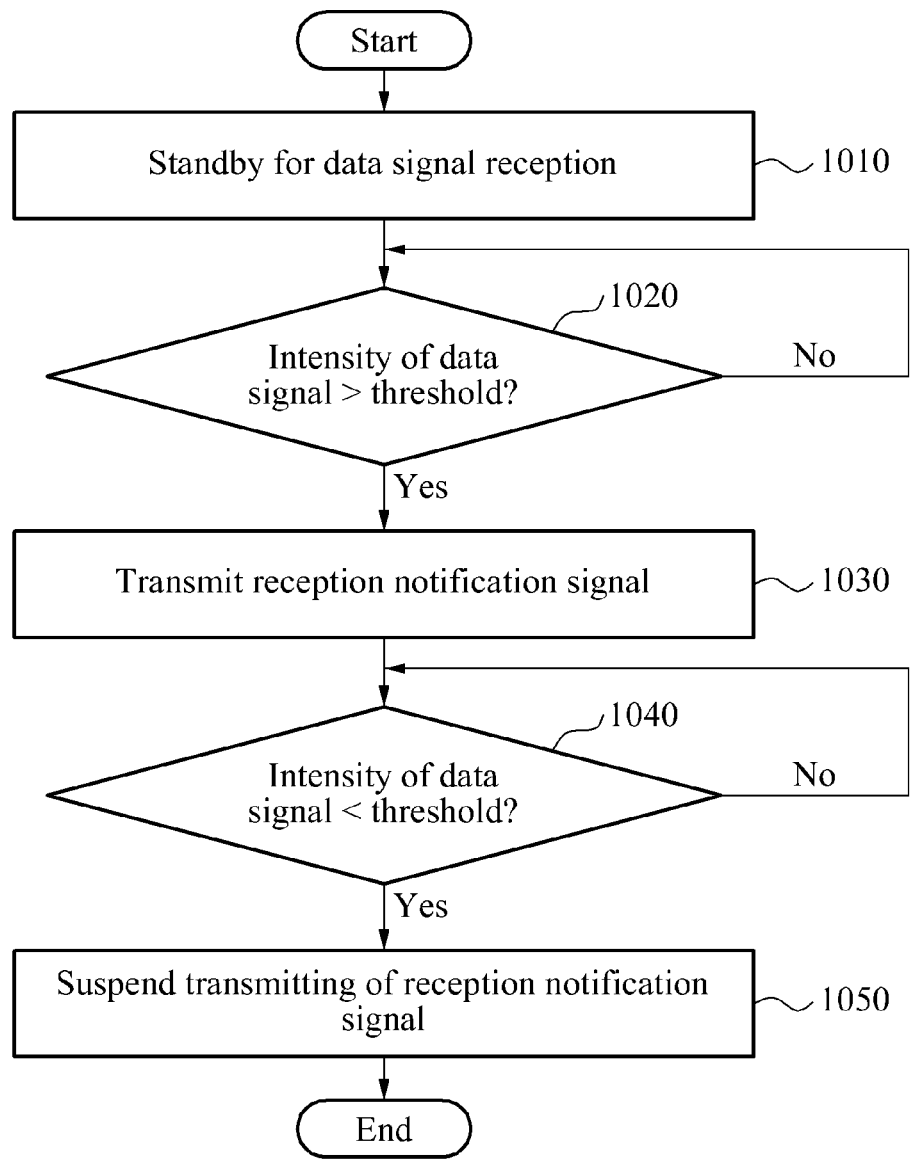
FIGS. 10 through 15 illustrate examples of transmitting a reception notification signal according to an embodiment of the present invention.

FIG. 10 illustrates an example of transmitting a reception notification signal according to an embodiment of the present invention.

Referring to FIG. 10, a hidden node detection apparatus may standby for data signal reception in operation 1010, and perform a first determination as to whether an intensity of a transmitted data signal is greater than a set threshold in operation 1020.

When a result of the first determination indicates that the intensity of the transmitted data signal is less than or equal to the set threshold, the hidden node detection apparatus may return to operation 1010 and standby for the data signal reception.

When the result of the first determination indicates that the intensity of the transmitted data signal is greater than the set threshold, the hidden node detection apparatus may generate a reception notification signal and transmit the reception notification signal to a plurality of communication devices sharing a wireless channel in operation 1030.

In operation 1040, the hidden node detection apparatus may perform a second determination as to whether the intensity of the transmitted data signal is less than the set threshold.

When a result of the second determination indicates that the intensity of the transmitted data signal is greater or equal to the set threshold, the hidden node detection apparatus may return to operation 1030 and continue the transmitting of the reception notification signal.

When the result of the second determination indicates that the intensity of the transmitted data signal is less than the set threshold, the hidden node detection apparatus may suspend the transmitting of the reception notification signal in operation 1050.

Figure 11:
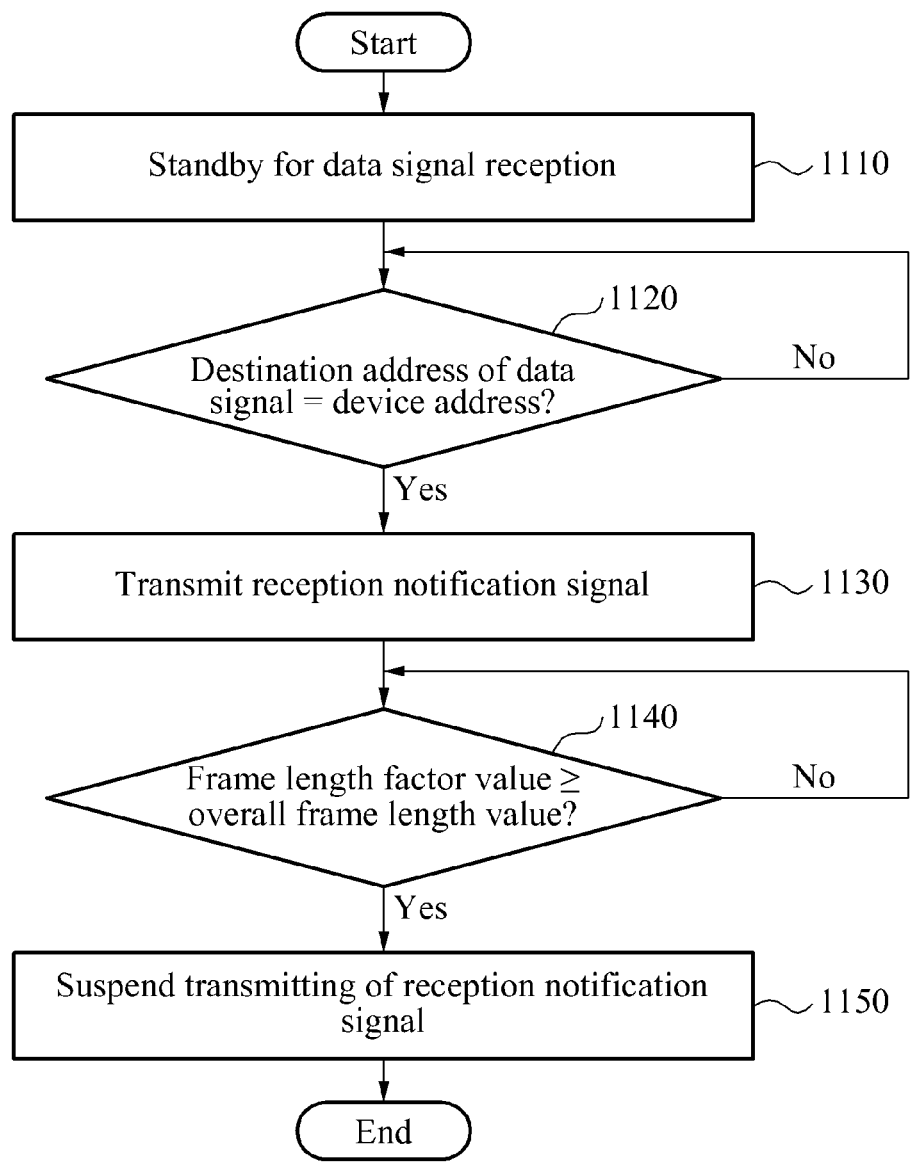

FIG. 11 illustrates another example of transmitting a reception notification signal according to an embodiment of the present invention.

Referring to FIG. 11, a hidden node detection apparatus may standby for a data signal reception in operation 1110, and perform a first determination as to whether a destination address of a transmitted data signal is identical to a set device address in operation 1120.

When a result of the first determination indicates that the destination address of the transmitted data signal is different from the set device address, the hidden node detection apparatus may return to operation 1110 and standby for the data signal reception.

When the result of the first determination indicates that the destination address of the transmitted data signal is identical to the set device address, the hidden node detection apparatus may generate a reception notification signal and transmit the reception notification signal to a plurality of communication devices in operation 1130.

In operation 1140, the hidden node detection apparatus may perform a second determination as to whether a frame length factor value of the transmitted data signal is greater than or equal to an overall frame length value.

When a result of the second determination indicates that the frame length factor value of the transmitted data signal is less than the overall frame length value the hidden node detection apparatus may return to operation 1130, and continue the transmitting of the reception notification signal.

When the result of the second determination indicates that the frame length factor value of the transmitted data signal is greater than or equal to the overall frame length value the hidden node detection apparatus may suspend the transmitting of the reception notification signal in operation 1150.

Figure 12:
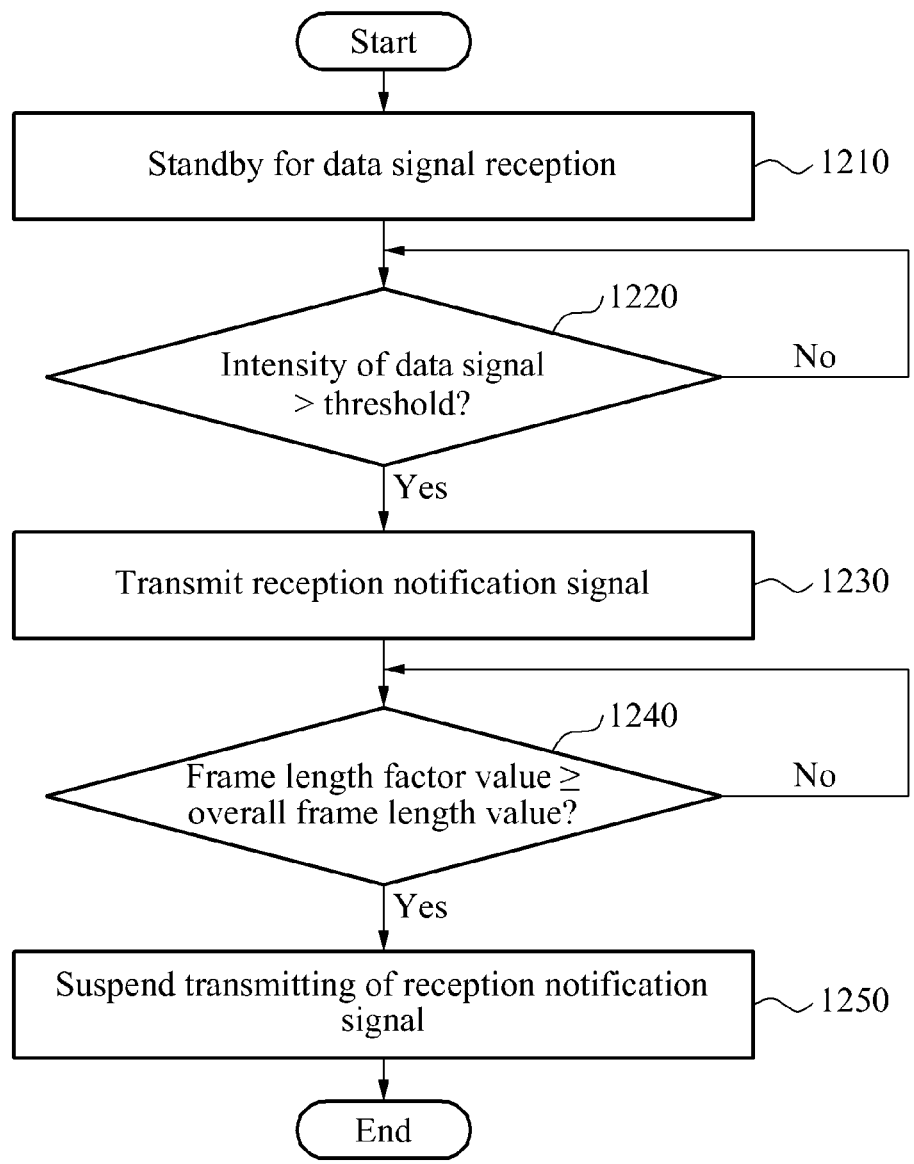

FIG. 12 illustrates still another example of transmitting a reception notification signal according to an embodiment of the present invention.

Referring to FIG. 12, a hidden node detection apparatus may standby for data signal reception in operation 1210, and perform a first determination as to whether an intensity of a transmitted data signal is greater than a set threshold in operation 1220.

When a result of the first determination indicates that the intensity of the transmitted data signal is less than or equal to the set threshold, the hidden node detection apparatus may return to operation 1210 and standby for the data signal reception.

When the result of the first determination indicates that the intensity of the transmitted data signal is greater than the set threshold, the hidden node detection apparatus may generate a reception notification signal and transmit the reception notification signal to a plurality of communication devices sharing a wireless channel in operation 1230.

In operation 1240, the hidden node detection apparatus may perform a second determination as to whether a frame length factor value of the transmitted data signal is greater than or equal to an overall frame length value.

When a result of the second determination indicates that the frame length factor value of the transmitted data signal is less than the overall frame length value the hidden node detection apparatus may return to operation 1230, and continue the transmitting of the reception notification signal.

When the result of the second determination indicates that the frame length factor value of the transmitted data signal is greater than or equal to the overall frame length value the hidden node detection apparatus may suspend the transmitting of the reception notification signal in operation 1250.

Figure 13:
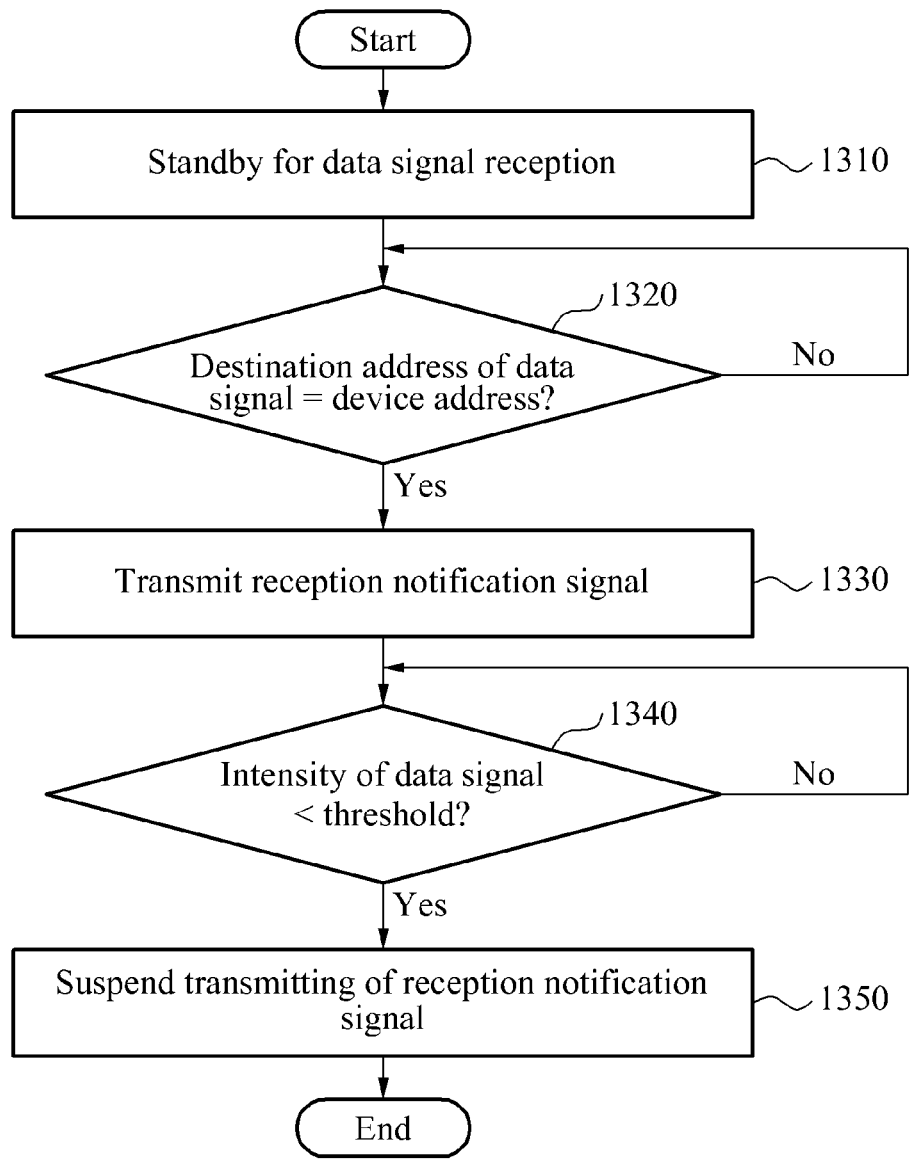

FIG. 13 illustrates yet another example of transmitting a reception notification signal according to an embodiment of the present invention.

Referring to FIG. 13, a hidden node detection apparatus may standby for a data signal reception in operation 1310, and perform a first determination as to whether a destination address of a transmitted data signal is identical to a set device address in operation 1320.

When a result of the first determination indicates that the destination address of the transmitted data signal is different from the set device address, the hidden node detection apparatus may return to operation 1310 and standby for the data signal reception.

When the result of the first determination indicates that the destination address of the transmitted data signal is identical to the set device address, the hidden node detection apparatus may generate a reception notification signal and transmit the reception notification signal to a plurality of communication devices in operation 1330.

In operation 1040, the hidden node detection apparatus may perform a second determination as to whether the intensity of the transmitted data signal is less than the set threshold.

When a result of the second determination indicates that the intensity of the transmitted data signal is greater than or equal to the set threshold, the hidden node detection apparatus may return to operation 1330 and continue the transmitting of the reception notification signal.

When the result of the second determination indicates that the intensity of the transmitted data signal is less than the set threshold, the hidden node detection apparatus may suspend the transmitting of the reception notification signal in operation 1350.

Figure 14:
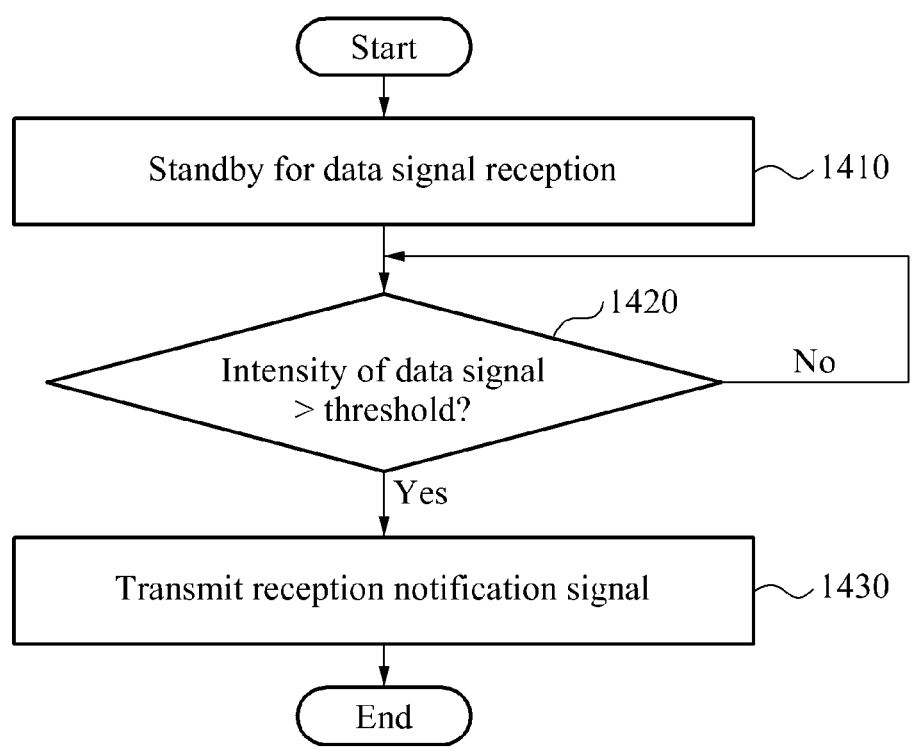

FIG. 14 illustrates further another example of transmitting a reception notification signal according to an embodiment of the present invention.

Referring to FIG. 14, a hidden node detection apparatus may standby for a data signal reception in operation 1410, and determine whether an intensity of a transmitted data signal is greater than a set threshold in operation 1420.

When a result of the determining indicates that the intensity of the transmitted data signal is less than or equal to the set threshold, the hidden node detection apparatus may return to operation 1410 and standby for the data signal reception.

When the result of the determining indicates that the intensity of the transmitted data signal is greater than the set threshold, the hidden node detection apparatus may generate a reception notification signal and transmit the reception notification signal to a plurality of communication signal sharing a wireless channel in operation 1430.

In this example, the hidden node detection apparatus may encode, for example, duration field information on an 802.11 MAC frame, to the reception notification signal, and transmit the encoded reception notification signal. In this instance, the hidden node detection apparatus may transmit the reception notification signal to a plurality of communication devices, and immediately suspend the transmitting.

Figure 15:
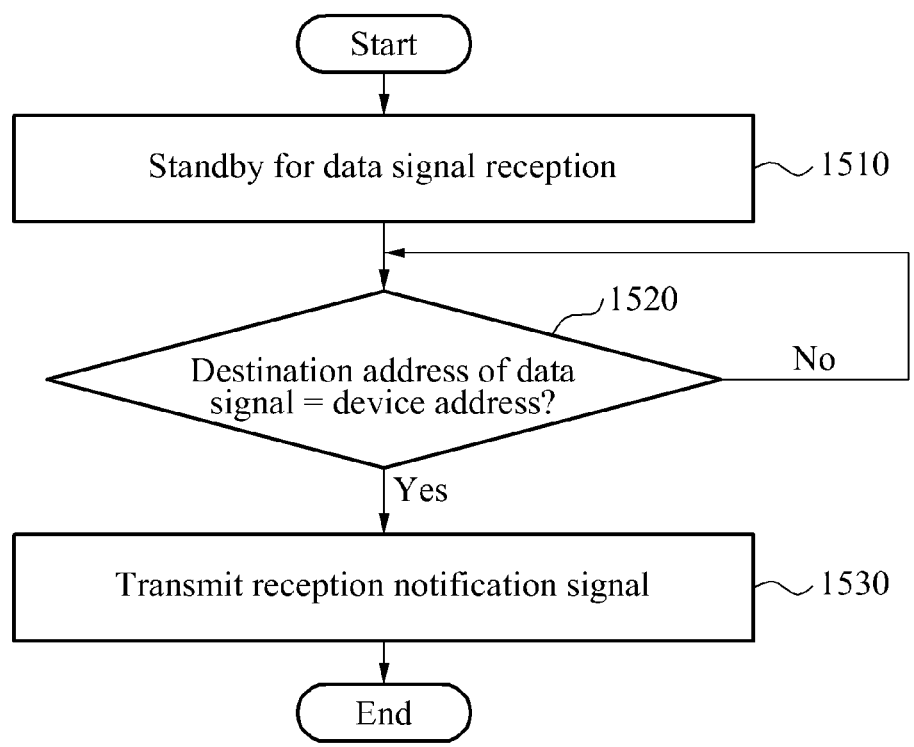

FIG. 15 illustrates still another example of transmitting a reception notification signal according to an embodiment of the present invention.

Referring to FIG. 15, a hidden node detection apparatus may standby for a data signal reception in operation 1510, and determine whether a destination address of a transmitted data signal is identical to a set device address in operation 1520.

When a result of the determining indicates that the destination address of the transmitted data signal is different from the set device address, the hidden node detection apparatus may return to operation 1510 and standby for the data signal reception.

When the result of the determining indicates that the destination address of the transmitted data signal is identical to the set device address, the hidden node detection apparatus may generate a reception notification signal and transmit the reception notification signal to a plurality of communication devices in operation 1530.

In this example, the hidden node detection apparatus may encode, for example, duration field information on an 802.11 MAC frame, to the reception notification signal, and transmit the encoded reception notification signal. In this instance, the hidden node detection apparatus may transmit the reception notification signal to a plurality of communication devices, and immediately suspend the transmitting.

According to an embodiment of the present invention, power consumption due to transmission and reception of a reception notification signal may be reduced.

Figure 17:
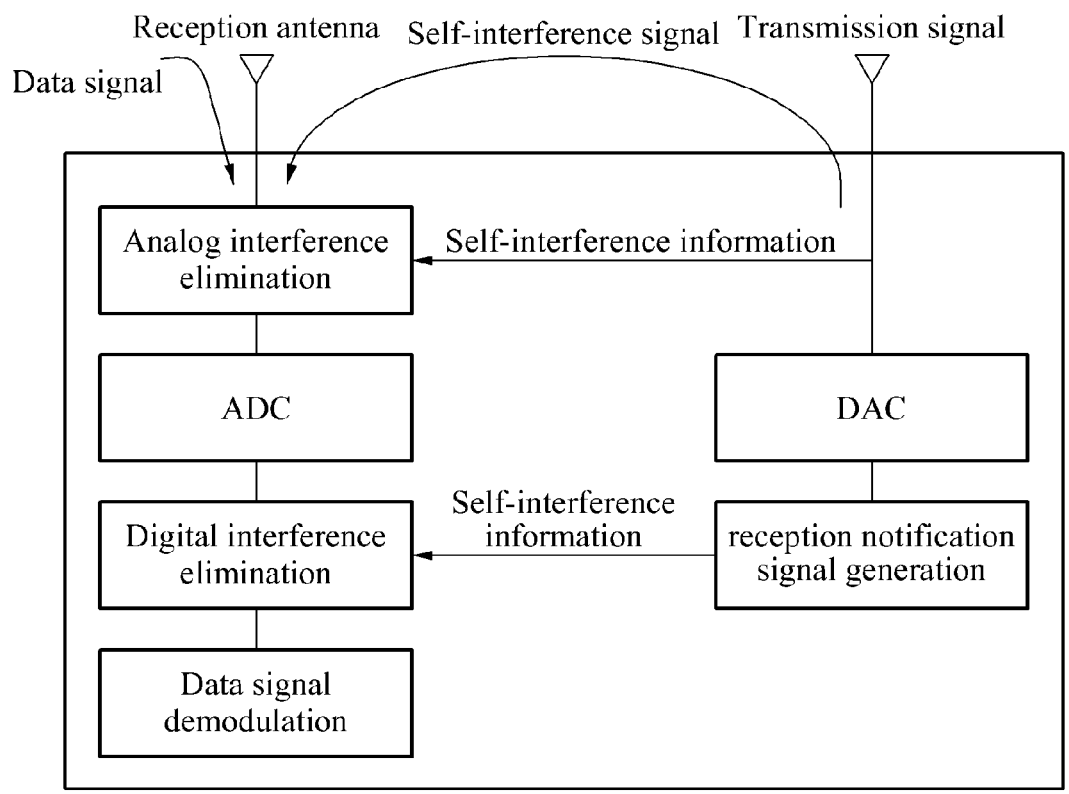
FIG. 17 illustrates an internal configuration of a transmitter transmitting a reception notification signal according to an embodiment of the present invention.

FIG. 17 illustrates an internal configuration of a transmitter transmitting a reception notification signal according to an embodiment of the present invention.

Referring to FIG. 17, when a hidden node detection apparatus receives a data signal and simultaneously transmits the reception notification signal, a self-interference signal may affect the hidden node detection apparatus. When the reception notification signal is transmitted in duplicate with a frequency position of the data signal, an effect of the self-interference may increase.

The hidden node detection apparatus may eliminate the self-interference signal based on an analog level and a digital level. Since the reception notification signal corresponds to a narrowband signal, the hidden node detection apparatus may effectively prevent self-interference caused by the reception notification signal using an analog or digital filter.

Figure 18:
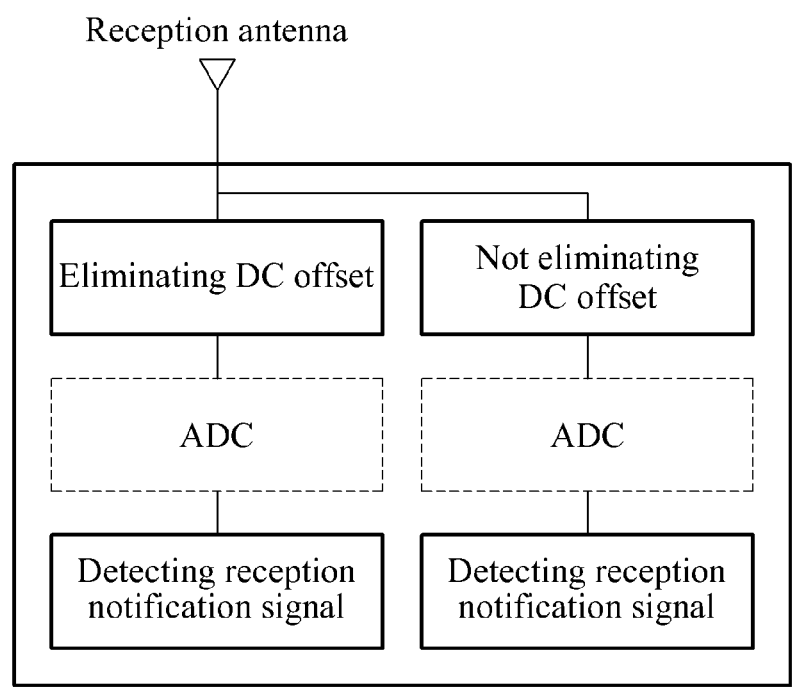
FIG. 18 illustrates a receiver of each of a plurality of communication devices receiving a reception notification signal according to an embodiment of the present invention.

FIG. 18 illustrates a receiver of each of a plurality of communication devices receiving a reception notification signal according to an embodiment of the present invention. Referring to FIG. 18, when the reception notification signal is transmitted through a band, for example, a subcarrier 903 of FIG. 9, corresponding to a direct current (DC) area, a hidden node detection apparatus may abnormally receive the reception notification signal due to a DC offset elimination device. In this example, the hidden node detection apparatus may detect the reception notification signal without eliminating a DC offset.

Hereinafter, descriptions about an operation of the hidden node detection apparatus 500 will be provided with reference to FIG. 22.

Figure 22:
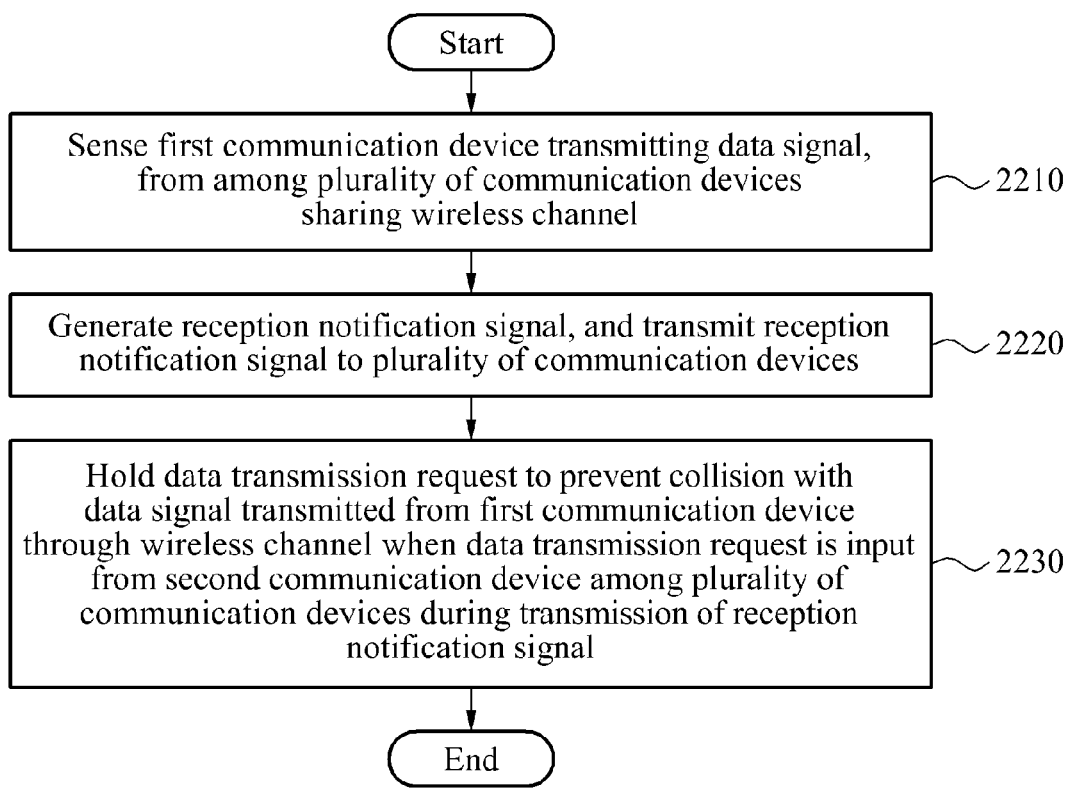
FIG. 22 illustrates a hidden node detection method in a wireless communication system according to an embodiment of the present invention.

FIG. 22 illustrates a hidden node detection method in a wireless communication system according to an embodiment of the present invention.

The hidden node detection method in a wireless communication system according to an embodiment of the present invention may be performed by the hidden node detection apparatus 500.

Referring to FIG. 22, in operation 2210, the hidden node detection apparatus 500 may sense a first communication device transmitting a data signal, from among a plurality of communication devices sharing a wireless channel.

The hidden node detection apparatus 500 may sense a channel state in a physical state based on whether a detected RF energy is greater than a threshold, or sense whether the wireless channel is being used by the first communication device, based on a channel occupation time in a frame transmitted from a node obtaining a wireless channel, for example, the first communication device.

In operation 2220, the hidden node detection apparatus 500 may generate a reception notification signal in response to the sensing of the first communication device, and transmit the reception notification signal to the plurality of communication devices through a band identical to a transmission band of the data signal.

For example, the hidden node detection apparatus 500 may achieve an effect of reducing protocol overhead by transmitting the reception notification signal using a band identical to a band through which the data signal is transmitted, in lieu of a separate control channel for the reception notification signal.

Also, the hidden node detection apparatus 500 may generate the reception notification signal based on a tone signal of at least one narrowband.

According to an embodiment of the present invention, overhead caused during transmission of a reception notification signal may be minimized by generating the reception notification signal based on a tone signal. In addition, according to an embodiment of the present invention at least one narrowband signal may be transmitted to each communication device as a reception notification signal, thereby minimizing an effect of self-interference due to the reception notification signal in a communication device demodulating a transmitted data signal.

The hidden node detection apparatus 500 may transmit the reception notification signal to the plurality of communication devices through a frequency interval, aside from a band through which the data signal is transmitted in the wireless channel.

The hidden node detection apparatus 500 may encode information on a transmission time to the reception notification signal, and transmit the encoded reception notification signal.

The hidden node detection apparatus 500 may determine a transmission time during which transmission of the reception notification signal is maintained, based on length field information in a PLCP header included in the data signal, or duration information in a MAC address header included in the data signal.

The hidden node detection apparatus 500 may determine, to be the transmission time, a value obtained by dividing a channel occupation time during which the first communication device occupies the wireless channel, by a compression ratio of the reception notification signal.

In operation 2230, when a data transmission request is input from the second communication device among the plurality of communication devices during transmission of the reception notification signal, the hidden node detection apparatus 500 may delay processing of the data transmission request to prevent a collision with the data signal transmitted from the first communication device through the wireless channel.

According to an embodiment of the present invention, in response to sensing of a first communication device transmitting a data signal, a reception notification signal may be generated, the generated reception notification signal may be transmitted to a plurality of communication devices sharing a wireless channel with the first communication device, and notification indicating that the first communication device occupies the wireless channel may be provided to each of the communication devices, thereby solving a hidden node issue in a wireless communication system and reducing protocol overhead.

According to an embodiment of the present invention, processing of a data transmission request input from a second communication device while transmission of the reception notification signal is maintained may be delayed to effectively prevent a collision between data signals transmitted through the wireless channel.

In an embodiment, the hidden node detection apparatus 500 may generate the reception notification signal to include predetermined power information, and transmit the generated reception notification signal to the plurality of communication devices.

Through this, the hidden node detection apparatus 500 may prevent an occurrence of a hidden node issue, and control a transmission power of a second communication device receiving the reception notification signal based on the predetermined power information.

When the reception notification signal is transmitted to include the predetermined power information, the hidden node detection apparatus 500 may need to be aware of a transmission end time associated with a data signal of a first communication device in order to suspend transmission of the reception notification signal.

As an example, when an intensity of the data signal is less than or equal to a set threshold, the hidden node detection apparatus 500 may suspend the transmission of the reception notification signal. When a frame length calculated with respect to the data signal satisfies a determined overall frame length value, the hidden node detection apparatus 500 may suspend the transmission of the reception notification signal.

When the transmitting of the reception notification signal is suspended, the hidden node detection apparatus 500 may control a data signal of the second communication apparatus to be transmitted through the wireless channel in response to the data transmission request.

According to an aspect of the present invention, it is possible to generate a reception notification signal in response to sensing a first communication device transmitting a data signal, transmit the reception notification signal to a plurality of communication devices through a band identical to a transmission band of the data signal, and provide notification on an occupation of a wireless channel by the first communication device to each of the communication devices without using a separate control channel for the reception notification signal, thereby solving a hidden node issue in a wireless communication system and reducing protocol overhead.

According to another aspect of the present invention, it is possible to delay processing of a data transmission request input from a second communication device while maintaining transmission of a reception notification signal, thereby effectively preventing a collision between data signals transmitted through a wireless channel.

According to still another aspect of the present invention, it is possible to minimize overhead caused due to transmission of a reception notification signal by generating the reception notification signal using a tone signal.

According to yet another aspect of the present invention, it is possible to minimize an effect of self-interference caused by a reception notification signal in a communication device demodulating a transmitted data signal by transmitting at least one narrowband signal to each communication device as the reception notification signal.

According to further another aspect of the present invention, it is possible to minimize an effect of self-interference caused by a reception notification signal in a communication device demodulating a transmitted data signal by transmitting at least one narrowband signal to each communication device as the reception notification signal.

According to still another aspect of the present invention, it is possible to detect a reception notification signal generated using at least one narrowband signal with additional ease by detecting whether the reception notification signal is transmitted to each communication device by applying a weight to a narrowband signal position based on a carrier sensing scheme.

According to yet another aspect of the present invention, it is possible to detect a reception notification signal with additional ease by detecting whether the reception notification signal is transmitted to each communication device based on a difference in an average power density between a band through which the reception notification signal is transmitted and a band through which the reception notification signal is not transmitted.

According to further another aspect of the present invention, it is possible to transmit and receive, before transmission of a data signal, an RTST signal and a CTST signal provided in a tone structure to have a shorter length when compared to an RTS/CTS control packet, and provide notification on an occupation of a wire channel by a first communication device, to a plurality of communication devices, thereby reducing protocol overhead.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hidden node detection apparatus in a wireless communication system, the apparatus comprising:
a sensing unit to sense a first communication device transmitting a data signal from among a plurality of communication devices sharing a wireless channel;
a transmitter to generate a reception notification signal in response to the sensing, and transmit the reception notification signal to a plurality of communication devices through a band identical to a transmission band of the data signal,
wherein the transmitter transmits the reception notification signal continuously when an intensity of the transmitted data signal is greater or equal to a set threshold or a frame length of the transmitted data signal is less than an overall frame length value; and
a controller to prevent a collision with the data signal transmitted from the first communication device through the wireless channel by delaying processing of a data transmission request when the data transmission request is input from a second communication device among the plurality of communication devices while maintaining the transmitting of the reception notification signal,
wherein the controller controls a data signal of the second communication device when the transmission of the reception notification signal is suspended.

2. The apparatus of claim 1, wherein the sensing unit senses the first communication device transmitting the data signal, based on a carrier sensing scheme.

3. The apparatus of claim 1, wherein the sensing unit senses a communication device transmitting a data signal having an intensity greater than a set threshold, to be the first communication device.

4. The apparatus of claim 1, wherein the sensing unit senses a communication device transmitting a data signal from which a destination address identical to a set device address is acquired, to be the first communication device.

5. The apparatus of claim 1, wherein the transmitter generates the reception notification signal to comprise predetermined power information, and transmits the reception notification signal to the plurality of communication devices.

6. The apparatus of claim 1, wherein when the intensity of the transmitted data signal is less than or equal to the set threshold, the transmitter suspends transmission of the reception notification signal.

7. The apparatus of claim 1, wherein when the frame length calculated with respect to the transmitted data signal satisfies the overall frame length value, the transmitter suspends transmission of the reception notification signal.

8. The apparatus of claim 6, wherein when the transmitting of the reception notification signal is suspended, the controller controls the data signal of the second communication apparatus to be transmitted through the wireless channel in response to the data transmission request.

9. The apparatus of claim 1, further comprising:
a determiner to determine a transmission time during which the transmitting of the reception notification signal is maintained based on length field information in a physical layer convergence procedure (PLCP) header included in the data signal, or duration information in a media access control (MAC) address header included in the data signal.

10. The apparatus of claim 9, wherein the transmitter encodes information on the transmission time to the reception notification signal, and transmits the encoded reception notification signal.

11. The apparatus of claim 9, wherein the determiner determines, to be the transmission time, a value obtained by dividing a channel occupation time during which the first communication apparatus occupies the wireless channel by a compression ratio of the reception notification signal.

12. The apparatus of claim 1, wherein the transmitter generates the reception notification signal based on a tone signal of at least one narrowband.

13. The apparatus of claim 12, wherein the transmitter transmits the reception notification signal of the narrowband to have a greater power density per frequency than that of the data signal.

14. The apparatus of claim 1, further comprising:
a detector to detect whether the reception notification signal is received by the plurality of communication devices, based on a difference in an average power density between a band to which the reception notification signal is transmitted and a band to which the reception notification signal is not transmitted.

15. The apparatus of claim 1, wherein the transmitter transmits the reception notification signal to the plurality of communication devices based on a frequency interval in the wireless channel.

16. The apparatus of claim 1, further comprising:
a tone signal unit to receive a request-to-send tone (RTST) signal of a tone structure from the first communication device before transmission of the data signal, transmits a clear-to-send tone (CTST) signal of a tone structure in response to the receiving of the RTST signal, and provides, to the second communication device, notification on the transmitting of the data signal transmitted from the first communication device through the wireless channel.

17. A hidden node detection method in a wireless communication system, the method comprising:
sensing a first communication device transmitting a data signal, from among a plurality of communication devices sharing a wireless channel;
generating a reception notification signal in response to the sensing, and transmitting the generated reception notification signal to the plurality of communication devices through a band identical to a transmission band of the data signal,
wherein the reception notification signal is transmitted continuously when an intensity of the transmitted data signal is greater or equal to a set threshold or a frame length of the transmitted data signal is less than an overall frame length value; and
preventing a collision with the data signal transmitted from the first communication device through the wireless channel, by delaying processing of a data transmission request when the data transmission request is input from a second communication device among the plurality of communication devices while maintaining transmission of the reception notification signal,
wherein a data signal of the second communication device is controlled by a controller when the transmission of the reception notification signal is suspended.

18. The method of claim 17, further comprising:
suspending transmission of the reception notification signal when the intensity of the transmitted data signal is less than or equal to the set threshold, or when the frame length calculated with respect to the transmitted data signal satisfies the overall frame length value; and
controlling, when the transmission of the reception notification signal is suspended, in response to the data transmission request, the data signal of the second communication device to be transmitted through the wireless channel.

19. The method of claim 17, wherein the transmitting comprises generating the reception notification signal based on a tone signal of at least one narrowband, and transmitting the reception notification signal of the narrowband to have a greater power density per frequency than that of the data signal.

20. The method of claim 17, further comprising:
determining a transmission time during which transmission of the reception notification signal is maintained, based on length field information in a physical layer convergence procedure (PLCP) header comprised in the data signal, or duration information in a media access control (MAC) address header comprised in the data signal; and
encoding information on the transmission time to the reception notification signal and transmitting the encoded reception notification signal to the plurality of communication devices.

* * * * *